United States Patent Office 3,290,269
Patented Dec. 6, 1966

3,290,269
NAPHTHYLDIMETHYLENE SPACED PHENYL GLYCIDYL ETHERS
John O'Brochta, Pittsburgh, Pa., assignor to Koppers Company, Inc., a corporation of Delaware
No Drawing. Filed Apr. 1, 1963, Ser. No. 269,779
2 Claims. (Cl. 260—47)

This invention relates generally to novel resins and more particularly to novel epoxy resins.

Epoxy resins are finding wide use as ingredients in coating, adhesive, potting, and encapsulating compositions. A catalyst curing agent or hardener such for example as an anhydride, an amine, or a $BF_3$ complex in the composition reacts with the epoxy resin to convert the resin to the ultimate product.

D'Alelio Patent No. 2,658,884 describes an epoxy resin that is aromatic in character but has only carbon-to-carbon bonds between between the phenyl compounds. Thus, the phenyl or alkyl phenyl groups which contain the glycidyl ethers are connected by methylene bridges. The polymeric is represented by a series of repeating units. The general structure is illustrated as:

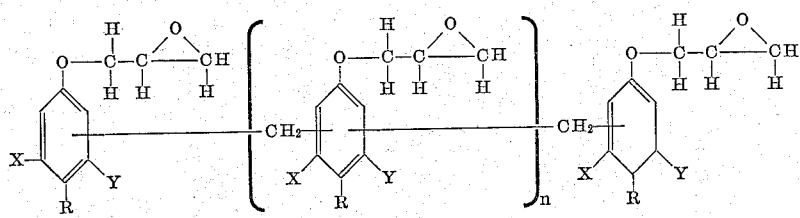

wherein R is a substituent of the class consisting of alkyl, aryl, aralkyl, alkaryl, and alkaryl groups or chlorene or hydrogen. X and Y are substituents selected from the class consisting of hydrogen, chlorene, and alkyl and hydroxyl groups.

The foregoing resins are prepared by condensing a phenol with an aldehyde under acid conditions to produce a novolak resin and then the novolak resin epoxidized by condensation with epichlorhydrin under alkaline conditions.

There has now been discovered in accordance with this invention novel resins in which the phenyl glycidyl ethers are separated by the large and inert group—naphthyldimethylene.

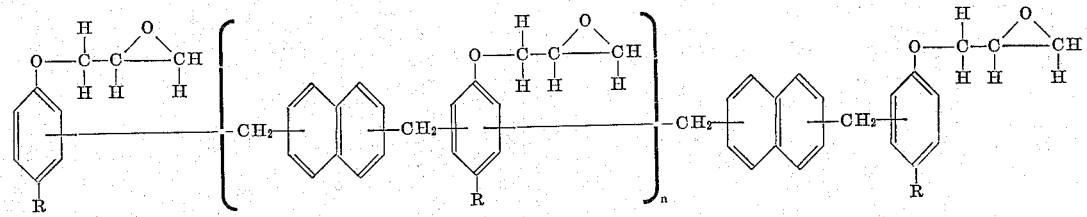

where
$n=2-7$
R = hydrogen or a methyl group

These resins are made by the condensation of bis-(chloromethyl) naphthalene and a phenol and then reacting the condensation product with epichlorohydrin to produce a novel epoxy resin.

The bis(chloromethyl) naphthalene may readily be prepared in accordance with the process described in United States Patent No. 1,910,462. Briefly, this involves the reaction of naphthalene, formaldehyde, and hydrogen chloride.

The bis(chloromethyl) naphthalene is condensed with a phenol, advantageously phenol or cresol, in the presence of a Friedel-Crafts catalyst at elevated temperatures. The resulting condensation product is characterized by the repeating units.

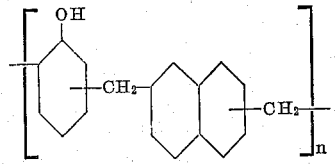

where $n=3-8$.

The condensate product is condensed with epichlorohydrin in the presence of an alkali metal hydroxide in accordance with the general procedure described in United States Patent No. 2,995,583.

The epoxy resins, when hardened by suitable catalysts, hardeners, and curing agents provide products which find use where high impact strength, good alkali resistance, and excellent electrical properties are required.

The invention will be illustrated further by the following examples:

*Example I*

To a flask equipped with a reflux condenser and a thermometer is charged a mixture of 900 grams of an aqueous solution of formaldehyde (30% strength) and 600 grams of concentrated hydrochloric acid, and 270 grams of naphthalene is added thereto. The mixture is then heated to reflux and with a stirring a current of gaseous hydrochloric acid is introduced for about 12 hours. After cooling, the solid product is separated from the mother liquor, washed with water and dried under vacuum. The crude bis (chloromethyl) naphthalene is purified by recrystallization in acetone to yield about an equal mixture of the 1,4- and 1-5-isomers of bis(chloromethyl) naphthalene.

To a one liter resin flask, equipped with stirrer, thermometer, heated dropping funnel and reflux condenser was charged 141 g. (1.5 m.) of phenol and 0.1 g. of $ZnCl_2$. The mixture was heated to 135° C. under an atmosphere of nitrogen and maintained at this temperature while 203.4 g. (0.9 m.) of bis(chloromethyl)naphthalene (M.P. 123–126° C., Cl 29.1%) in 400 ml. of o-dichlorobenzene (soluble at 70° C.) was added over a period of two hours. An immediate and vigorous evolution of HCl occurred upon the addition of the bis(chloromethyl)naphthalene. After addition had been completed, nitrogen was bubbled through the reaction mixture while the temperature was maintained at 135° C. until HCl evolution ceased. This required about one hour. The mix was then devolatilized at a temperature of 170° C. and under a vacuum of 10 mm. of mercury. There was obtained 261.2 g. (94% theory) of a tan resin which was soluble in dichlorobenzene, acetone, epichlorohydrin, and dilute sodium hydroxide but only partially soluble in aromatic solvents such as toluene and benzene. It had a molecular weight of 835, softening point (R. and B.) of 117° C. and a total hydroxyl content of 8.2%. The structure is illustrated below:

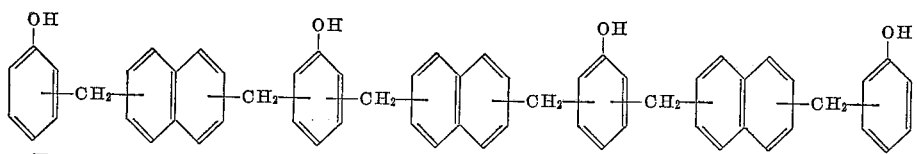

To a two liter resin pot, equipped with a stirrer, thermometer, dropping funnel, condenser and heated burette, was charged 207 g. (1.0 eq.) the foregoing novel resin, and 622 ml. (8.0 moles) epichlorohydrin. The mixture was heated to 117° C., to obtain a clear solution, and then cooled to 84° C. Then 29 grams of sodium hydroxide (1.02 moles) were added as a 70% solution by means of the heated burette. One-half of the caustic was added over a period of thirty minutes at a temperature of 92–96° C., under conditions of total reflux. The remaining caustic was added over a period of thirty minutes at a temperature of 99–110° C., the water distilled off as rapidly as possible. The reaction mixture was devolatilized at 150° C. at a vacuum of 25 mm. mercury. Toluene (1030 ml.) was added and 100 ml. of added toluene was distilled. After cooling to 40° C., the mix was filtered and devolatilized at a residue temperature of 150° C. at a vacuum of 25 m. of mercury to yield 255 g. (97% theory) of resin. The product was a slightly cloudy tan resin containing 5.5% ox–ox, 0.4% chlorine and having a Durrans S.P. of 92° C. Theory for the postulated product calls for an ox–ox value of 6.2%. The product had the general structure:

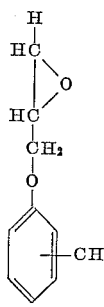 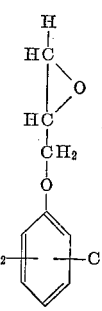 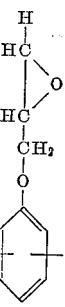 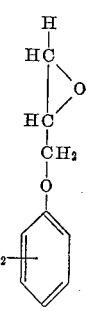

The foregoing has presented novel resins. As will be apparent to those skilled in the art, the novel resins provide a great amount of flexibility as to molecular weight and glycidyl radicals per molecule. For example, the phenols which are condensed with the bis(chloromethyl)naphthalene may be substituted phenols. Further, the molecular weight may be controlled by ratio of phenol to the bis(chloromethyl)naphthalene. Advantageously, the ratio ranges from 2½ moles of phenol per mole of bis(chloromethyl)naphthalene to 10 moles of phenol per mole of bis(chloromethyl)naphthalene. The ratios are not particularly critical except that with insufficient phenol, the solubility of the ingredients may create problems and with too much phenol, undesirable by-products are produced. Further flexibility, as far as the product, is increased in that by controling the extent of etherification, free hydroxyl radicals may be present in the epoxy resin. The extent of etherification can be controlled by controlling the amount of epichlorohydrin present for etherification and the amount of alkali metal hydroxide for the etherification.

I claim:
1. The novel epoxy resin:

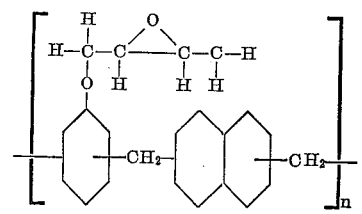

where $n=3-8$.

2. The novel epoxy resin:

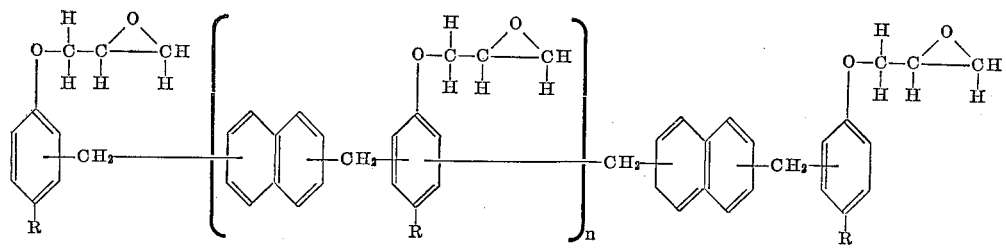

where
$n=2-7$
$R=$ hydrogen or a methyl group

No references cited.

WILLIAM H. SHORT, *Primary Examiner.*

T. D. KERWIN, *Assistant Examiner.*